United States Patent
Froehlich et al.

(10) Patent No.: US 10,382,883 B2
(45) Date of Patent: Aug. 13, 2019

(54) AUTOMATIC CALIBRATION OF GEOLOCATION ANALYTIC SYSTEMS AND OPERATOR NETWORK EQUIPMENT PARAMETERS

(71) Applicant: NetScout Systems, Inc, Westford, MA (US)

(72) Inventors: Robert William Froehlich, McKinney, TX (US); Karsten Gaenger, Berlin (DE); Wing F. Lo, Plano, TX (US)

(73) Assignee: NetScout Systems, Inc., Westford, MA (US)

(*) Notice: Subject to any disclaimer, the term of this patent is extended or adjusted under 35 U.S.C. 154(b) by 0 days.

(21) Appl. No.: 15/699,301

(22) Filed: Sep. 8, 2017

(65) Prior Publication Data
US 2019/0082287 A1    Mar. 14, 2019

(51) Int. Cl.
H04W 4/02 (2018.01)
G01S 5/02 (2010.01)
H04B 17/27 (2015.01)
H04W 24/02 (2009.01)
H04B 17/373 (2015.01)

(52) U.S. Cl.
CPC ............... *H04W 4/02* (2013.01); *G01S 5/021* (2013.01); *G01S 5/0252* (2013.01); *H04B 17/27* (2015.01); *H04B 17/373* (2015.01); *H04W 24/02* (2013.01)

(58) Field of Classification Search
CPC ......... H04W 4/02; H04W 24/02; G01S 5/021; G01S 5/0252; H04B 17/27; H04B 17/373
USPC .................... 455/456.1–456.6, 457
See application file for complete search history.

(56) References Cited

U.S. PATENT DOCUMENTS

| | | | |
|---|---|---|---|
| 6,407,703 B1 * | 6/2002 | Minter | G01S 5/02 342/450 |
| 7,433,695 B2 * | 10/2008 | Gordon | G01S 5/0252 455/404.2 |
| 2003/0125044 A1 | 7/2003 | Deloach et al. | |
| 2004/0203912 A1 * | 10/2004 | Budka | H04W 64/00 455/456.1 |
| 2008/0188244 A1 * | 8/2008 | Mazlum | G01S 5/021 455/456.6 |
| 2009/0005061 A1 * | 1/2009 | Ward | G01S 5/021 455/456.1 |

(Continued)

FOREIGN PATENT DOCUMENTS

WO    WO-2016089266 A1    6/2016

OTHER PUBLICATIONS

Extended European Search Report for European Patent Application EP18193095.9, dated Jan. 29, 2019.

*Primary Examiner* — Mong-Thuy T Tran
(74) *Attorney, Agent, or Firm* — Locke Lord LLP; Scott D. Wofsy; Christopher J. Capelli

(57) ABSTRACT

A method for calibrating geolocation analytic system in a wireless network includes receiving a first data set including measurement data associated with a mobile device connected to the wireless network from a first data source. A second data set comprising external geo-location data associated with the mobile device is received from a second data source. The first data set is compared to the second data set to estimate geo-location of the mobile device and to identify one or more errors using calibration function. The identified one or more errors are corrected based on the comparison.

17 Claims, 3 Drawing Sheets

(56) References Cited

U.S. PATENT DOCUMENTS

| | | | | |
|---|---|---|---|---|
| 2009/0131038 | A1* | 5/2009 | MacNaughtan | H04W 24/02 455/422.1 |
| 2010/0309051 | A1* | 12/2010 | Moshfeghi | H04W 4/029 342/378 |
| 2010/0324813 | A1* | 12/2010 | Sundararajan | G01C 21/20 701/532 |
| 2012/0214544 | A1* | 8/2012 | Shivappa | H04M 1/72572 455/556.1 |
| 2013/0021199 | A1* | 1/2013 | Fix | G01S 5/021 342/357.43 |
| 2013/0162481 | A1* | 6/2013 | Parvizi | G01S 3/023 342/452 |
| 2013/0217418 | A1* | 8/2013 | Maurin | H04W 4/02 455/456.3 |
| 2013/0285855 | A1* | 10/2013 | Dupray | G01S 19/48 342/451 |
| 2014/0024408 | A1 | 1/2014 | Fix et al. | |
| 2014/0155096 | A1* | 6/2014 | Niemenmaa | H04W 64/00 455/456.3 |
| 2015/0072714 | A1* | 3/2015 | Froehlich | H04W 4/023 455/457 |
| 2015/0350850 | A1* | 12/2015 | Edge | H04W 4/04 455/456.1 |
| 2016/0014713 | A1* | 1/2016 | Kennedy | G01S 5/0242 455/456.1 |
| 2016/0116598 | A1* | 4/2016 | Wu | G01S 19/23 342/357.62 |
| 2016/0127931 | A1* | 5/2016 | Baxley | G01S 5/0263 455/67.16 |
| 2016/0146922 | A1* | 5/2016 | Moshfeghi | H04W 64/006 455/456.6 |
| 2017/0192102 | A1* | 7/2017 | Wietfeldt | G01S 19/46 |
| 2018/0184394 | A1* | 6/2018 | Wang | H04B 17/318 |

\* cited by examiner

AUTOMATIC CALIBRATION OF GEOLOCATION ANALYTIC SYSTEMS AND OPERATOR NETWORK EQUIPMENT PARAMETERS

FIELD OF THE INVENTION

Embodiments of the present invention relate generally to telecommunications, and specifically to automatic calibration geolocation analytic systems and operator network equipment parameters.

BACKGROUND OF THE INVENTION

The increased terminal mobility offered by cellular telephone networks as well as mobile and WiFi radio data networks has brought about an increased demand for location-based services and applications. Location based services include, for example, fleet management, vehicle tracking, tracking for theft recovery, telemetry, emergency services, location identification, navigation, location based information services and location based advertising. A wide variety of technologies for locating mobile devices have been developed.

Geoanalytic Radio Access Network (RAN) monitoring and optimization systems utilize NEM (Network Equipment Manufacturer) RAN signaling to troubleshoot mobile subscribers' issues and to provide RAN performance KPIs. These systems utilize geolocation techniques such as triangulation to obtain subscriber location awareness (latitude/longitude) and enhance this geolocated data with Radio Frequency (RF) quality. This subscriber location awareness information can then assess if the subscriber was in good or bad RF conditions during a voice or data session. The accuracy of the geolocated data depends upon many factors and results better than ⅛ inter cell spacing is difficult to achieve. Additionally, the algorithms utilize 'morphologies' of the landscape types (building density, building height, highway, roads, lakes, forests, etc.) in the geolocation calculation.

Typical mobile device location technologies may be classified into external methods and network based methods. One example of an external method is the Global Positioning System ("GPS"). Network based methods (such as triangulation) may be further categorized depending on whether it is the network or the mobile device that performs necessary signal measurements. These signal measurements may involve the transmit power of a base station received by a mobile device, reception time of signals communicated between a base station and a mobile device, the angle of arriving signals or round trip delay measurements of signals communicated between a serving base station and a mobile device, or combinations thereof. One way to improve the accuracy of the stored geolocated data is to "calibrate" critical areas with drive test results where external reliable geolocation sources, such as GPS, are used to achieve about 5 meter accuracy.

However, drive testing is not advantageous in terms of cost and is seldom performed. Nevertheless, for many current and future location based applications, accuracy of the calculated position information should be improved.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for calibrating geolocation analytic system in a wireless network includes receiving a first data set comprising measurement data associated with a mobile device connected to the wireless network from a first data source. A second data set comprising external geo-location data associated with the mobile device is received from a second data source. The first data set is compared to the second data set to estimate geo-location of the mobile device and to identify one or more errors using calibration function. The identified one or more errors are corrected based on the comparison.

In another aspect, a self-calibrating geolocation analytic system in a wireless network is provided. The system includes a predictor database configured to receive and store geo-location data and radio signal measurement data associated with a mobile device connected to the wireless network from a plurality of first data sources. The system further includes an analyzing engine in communication with the predictor database and configured to retrieve from the predictor database and analyze a first data set including measurement data associated with the mobile device connected to the wireless network. The analysis of the first data set provides an estimated location of the mobile device. The system further includes a calibration engine having a processor and a memory device coupled to the processor in communication with the analyzing engine and in communication with a second data source configured to receive and store external geo-location data associated with the mobile device. The memory device contains a set of instructions that, when executed by the processor, cause the processor to receive the first data set and the estimated location of the mobile device from the analyzing engine and to receive a second data set including external geo-location data associated with the mobile device from the second data source. The set of instructions that, when executed by the processor, further cause the processor to compare the first data set to the second data set to adjust the estimated geo-location of the mobile device, to identify one or more errors using the received external geo-location data and to correct the identified one or more errors based on the comparison.

BRIEF DESCRIPTION OF THE DRAWINGS

The accompanying appendices and/or drawings illustrate various, non limiting, examples, inventive aspects in accordance with the present disclosure.

DETAILED DESCRIPTION OF CERTAIN EMBODIMENTS

Figure 1:
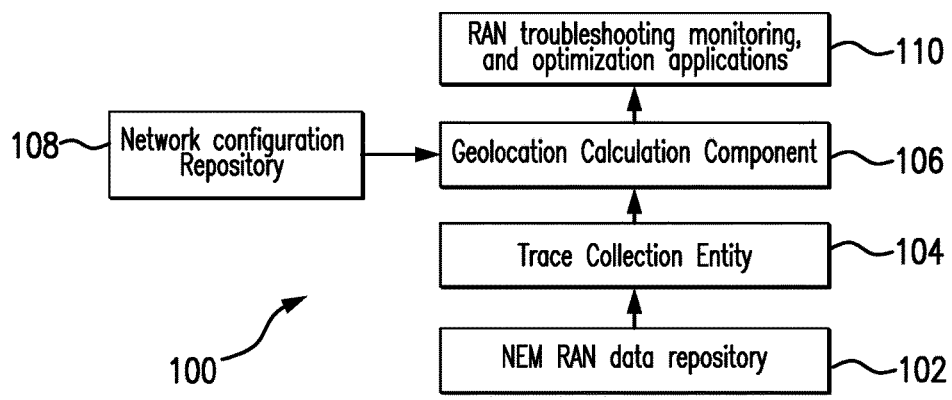
FIG. 1 is a simplified block diagram of an exemplary architecture of a conventional geoanalytic system utilizing passive data from NEM traceport feeds.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Positioning accuracy of radio technology is directly dependent on the accuracy of the delay measurements. For example, for navigation receivers that use GNSS, such as GPS or GLONASS (hereinafter collectively referred to as "GNSS") transmissions from non-GNSS frequencies that are near GNSS frequencies can cause degraded performance of GNSS services, such as less positional accuracy, by interfering with the delay measurements.

As noted above, for many current and future location based applications, accuracy of the calculated position information should be improved. Embodiments of the present invention contemplate improvement to the accuracy of conventional geoanalytic system by automatically utilizing 3GPP standard Minimizing Drive Test (MDT) data.

3GPP is in the process of defining solutions for MDT. The intention of the MDT work is documented in 3GPP TR 36.805 V9.0.0 (2009-12), 3rd Generation Partnership Project; Technical Specification Group Radio Access Network; Study on Minimization of drive-tests in Next Generation Networks (Release 9).

Stage 2 of MDT is currently being developed in TS 37.320, i.e., 3GPP TS 37.320, "Radio measurement collection for Minimization of Drive Tests (MDT); Overall description; Stage 2". MDTStage 2 includes a UE measurement logging function and immediate reporting function. The 3GPP TS 37.320 document essentially focuses on the UE measurement logging function.

In addition to drive tests and MDT data, accurate UE geolocation data can be obtained by various embodiments of the present invention from a wide range of applications ranging from Google Maps, network based navigation systems, access link speed test applications or even local weather requests. Many of these applications use GPS or GNSS satellite for geolocation but they may also use other additional information, for example, WiFi SSID or other low power location beacon technologies.

Wireless carriers typically require geoanalytics platforms to provide 100% geolocated subscriber sessions using the best available technology (from RAN signaling or MDT, GPS signaling). Various embodiments of the present invention provide a method of automatic geolocation calibration using a combination of all available GPS data from MDT or similar technical deployments. Advantageously, the method for calibrating results of various passive geolocation algorithms and correlation to the subscriber morphologies described below results in significant accuracy (median and kurtosis) improvement.

FIG. 1 is a simplified block diagram of an exemplary architecture of a conventional geoanalytic system utilizing passive data from NEM traceport feeds. The set of measurements collected from a UE is called "trace". The process of collecting the measurements is called "tracing". Currently, conventional geoanalytics systems 100 use RAN probes and NEM-based cell trace functionality to gather information from mobile devices used by subscribers to spot and fix various network problems. Collected NEM-based cell trace data as well as data collected by RAN probes may be stored in a NEM RAN data repository 102.

Generally, in a 3GPP network tracing may be activated in different network nodes, e.g. in the eNB (also termed eNodeB), which denotes the Base Station in LTE (Long Term Evolution), in the RNC (Radio Network Controller), which denotes the Base Station in 3G, in the MME (Mobility Management Entity), which constitutes the Core Network for LTE radio access, or the like. One skilled in the relevant art would recognize that the network tracing concepts described herein are equally applicable to other current or future cellular network technologies. Once tracing is activated in one of these network nodes, said network node configures tracing on the UEs. Typically, in various conventional geoanalytic systems, such as system 100 in FIG. 1, the measurements from the UEs are stored in a dedicated entity, which is called Trace Collection Entity (TCE) 104. The TCE 104 may be implemented as a database for the measurement data. Every time the geoanalytic system 100 receives the measurements, it reports them to the TCE 104. In general, multiple TCEs 103 can exist in the same geoanalytic system.

The conventional geoanalytic system 100 usually maintains a database of cell site equipment deployed in a corresponding wireless network. As shown in FIG. 1, such database may comprise a network configuration repository 108. The network configuration repository 108 may store information related to the geo coordinates of individual antennas of a distributed antenna system, antenna height, azimuth orientation of network's antenna radiation pattern and the propagation delay from the radio unit to the antenna radiation elements, and the like.

The system also includes a geolocation calculation component 106 that can similarly be implemented as hardware, firmware, software, or a combination thereof. The geolocation calculation component 106 can estimate a geolocation of the mobile device based on the information received from the network configuration repository 108 and the trace collection entity 104.

The conventional geoanalytic system 100 allows for multiple uses of the information provided by the geolocation calculation component 106 by various applications 110 associated with RAN, such as LTE, 3G and WiFi. Such applications 110 may include automated low cost drive and walk testing applications, cell site shakedown automation applications, small cell planning applications, maintenance window test automation applications, large event monitoring and optimization applications, monitoring and troubleshooting of RAN applications, E2E (end-to-end) load generation for small cells applications, QoS and QoE automation applications, and advanced troubleshooting and diagnostics applications.

The information provided by the geolocation calculation component 106 may also be used by various applications 110 for WiFi networks and WiFi devices, including customer experience management, performance, benchmarking, and monitoring (WiFi networks in enterprises, cities, streets), automation of voice over WiFi and handovers to 4G and 3G, voice quality testing of VoWiFi, video quality testing, automation of regression, sanity, and load testing, automation of WiFi device IoT and certification, and automation of alpha and beta testing.

The information provided by the geolocation calculation component 106 may also be used for various business and operations support systems 110, including, but not limited to, charging plans and services benchmarking, E2E billing and charging test automation, E2E conflict testing automation, maintenance window test automation, field test automation, lab regression and test automation, trend analysis, E2E load generation, and advanced diagnostics Business Support Systems (BSS) integration applications, among others.

Figure 2:
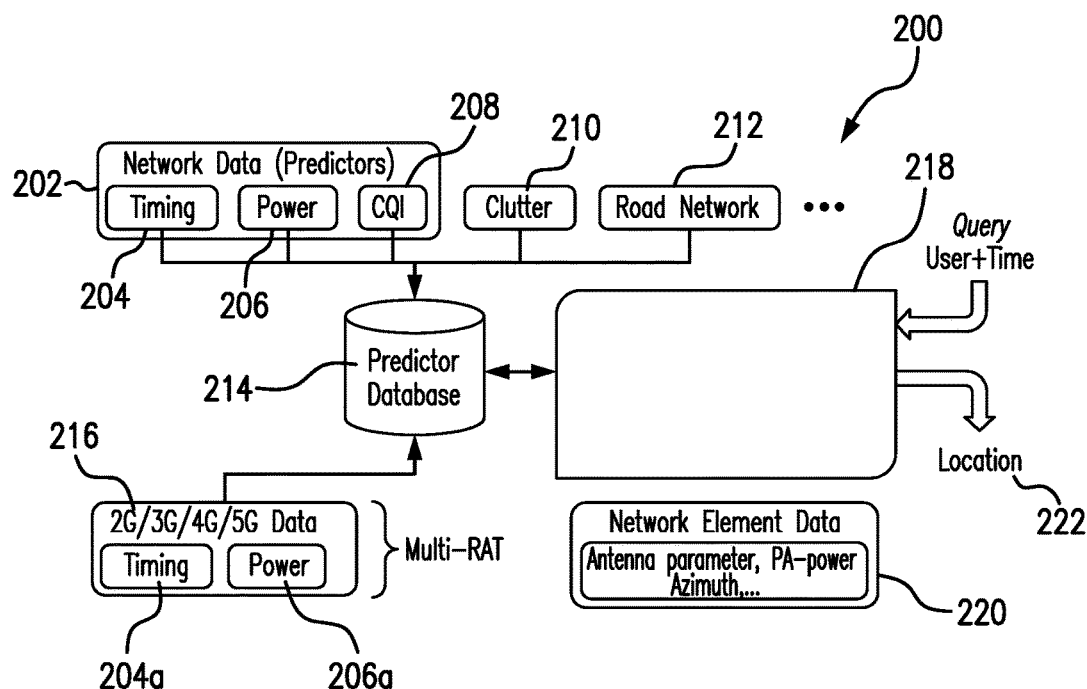
FIG. 2 is a simplified perspective diagram of an exemplary logical architecture of a conventional geoanalytic system.

FIG. 2 is a simplified perspective diagram of an exemplary logical architecture of a conventional geoanalytic system. Conventional geoanalytic systems, just like system 200 typically use various computationally feasible techniques for determining mobile device location history via multiple historical network data predictors 202. These techniques facilitate analysis of wireless network time series data corresponding to various time periods.

The exemplary network data predictors 202 include a repository of location tracking timing data 204. Each of the records in the repository of timing data 204 indicates a moment in time when the location tracking data is created. The network data predictor 202 may further include a plurality of power records 206 indicative of, for example, received signal strength or received power of base station specific reference signal at a particular device. In addition, the network data predictors 202 may include measures of "goodness" associated with wireless signals. For example, a mobile device may auto-report a channel-quality indicator (CQI) 208 every several time-slots and an average of the CQIs may be taken over a five-second interval to serve as a goodness-indicator. If the call fails within the five-second interval then the goodness-indicator may be low. The network data predictors 202 may also include other quality indicators, such as a bit error rate (BER), a number of packet retransmissions, a signal to noise ratio (S/N), a number of call failures, a user feedback, a user requested power-down at the same bit-rate, and/or a user requested power-up.

As shown in FIG. 2, in addition to the exemplary network data predictors 202, the geoanalytic system 200 includes a clutter data set 210 which characterizes clutter and a road network set 212. The clutter data set 210 represents a set of real world objects capable of influencing propagation of a radio signal such as, for example, water bodies, trees, grass, buildings, paved roads and bare ground. The clutter data set may represent at least a position of each pixel of a pixel array of an aerial view image of an area of the earth and an object type designation for each pixel. A complete and coherent road network 212 may be obtained by organically combining image processing technologies and trajectory information, for example. Additionally, with the elapse of time, the road network 212 can be constantly perfected using incremental trajectories obtained subsequently.

Furthermore, the geoanalytic system 200 may gather location data from the above described data sources 204-212 and may store such data along with corresponding network metrics gathered from various devices in a predictor database 214. The predictor database 214 may comprise a probabilistic model and a behavioral model tracking device metrics. In general, the predictor database 214 can collect any information which helps predict a device location as described herein.

As shown in FIG. 2, the predictor database 214 may further include real-time data 216 collected from various networks using different radio access technologies (RATs) to simultaneously transmit data. In some cases, at least some calls can be handed over between 3GPP 2G/3G/4G RATs. From a device's perspective, each RAT works on its own basis independently. For example, in some networks, a voice call via a GSM connection may disconnect a device from a 4G connection until the voice call ends. The coordination among multiple RATs may only take place at the moment when an inter-RAT handover is intended, even though in many cases, a cell site might support different RATs at the same time due to the limitations in resources, e.g., site acquisition and maintenance costs, etc. Actually, the real-time data 216 may include the repository of timing data 204a and the plurality of signal power records 206a.

The conventional geoanalytic system 200 typically determines an approximate location of a device specified by a user query (e.g., user+time) by using a probability function 218. Such probability function 218 may incorporate errors and historical information. In addition, the probability function 218 may be configured to combine multiple predictors stored in the predictor database 216 as well as apply network element data to find a most likely location 222 of a device. The network element data repository 220 may store information related to the geo coordinates of individual antennas of a distributed antenna system, antenna height, azimuth orientation of network's antenna radiation pattern and the propagation delay from the radio unit to the antenna radiation elements, and the like.

Figure 3:
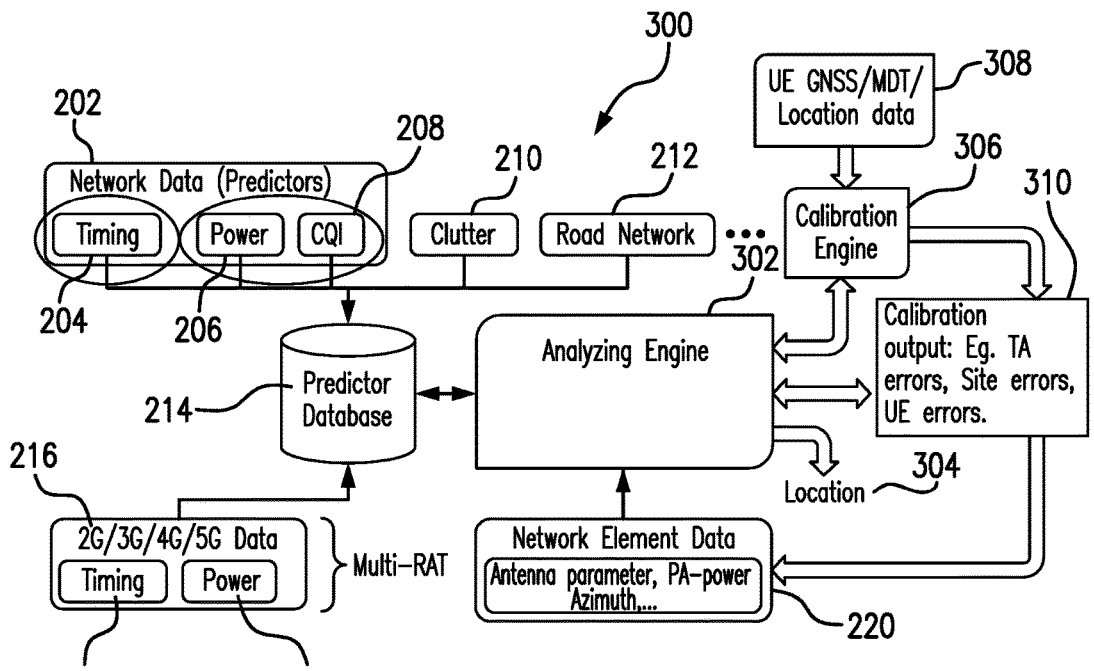
FIG. 3 illustrates a functional block diagram of an exemplary architecture of a geoanalytic system utilizing passive network and UE data and calibration based on external reliable high accuracy geolocation data, in accordance with an embodiment of the present disclosure.

FIG. 3 illustrates a functional block diagram of an exemplary architecture of a geoanalytic system utilizing passive network and UE data and calibration based on external reliable high accuracy geolocation data, in accordance with an embodiment of the present disclosure. Elements of the geoanalytic system 300 that correspond to conventional geoanalytic system 200 described above with reference to FIG. 2 are indicated using the same reference numerals and will not be described again in detail.

According to an embodiment of the present invention, the geoanalytic system 300 includes an analyzing engine 302 utilizing core geolocation algorithms to estimate a location 304 of a device based on passive network data, UE predictors and various meta data. The geoanalytic system 300 further includes a calibration engine 306 that is configured to identify errors/differences between the calculated location 304 and more reliable external geolocation data 308. In some embodiments, the calibration engine 306 may calibrate the locations of the wireless access points. The more reliable external geolocation data 308 may include GNSS/MDT location data. Such geolocation data 308 may be stored using a geo-location reference format, e.g., using a combination of one or more of: longitude, latitude, altitude, and velocity. In various embodiments, the output 310 generated by the calibration engine 306 can include TA value errors, site errors, UE errors, UE errors in radio channel conditions reports to base stations and the like. In one embodiment, the calibration engine 306 includes a processor and a memory device coupled to the processor.

Figure 4:
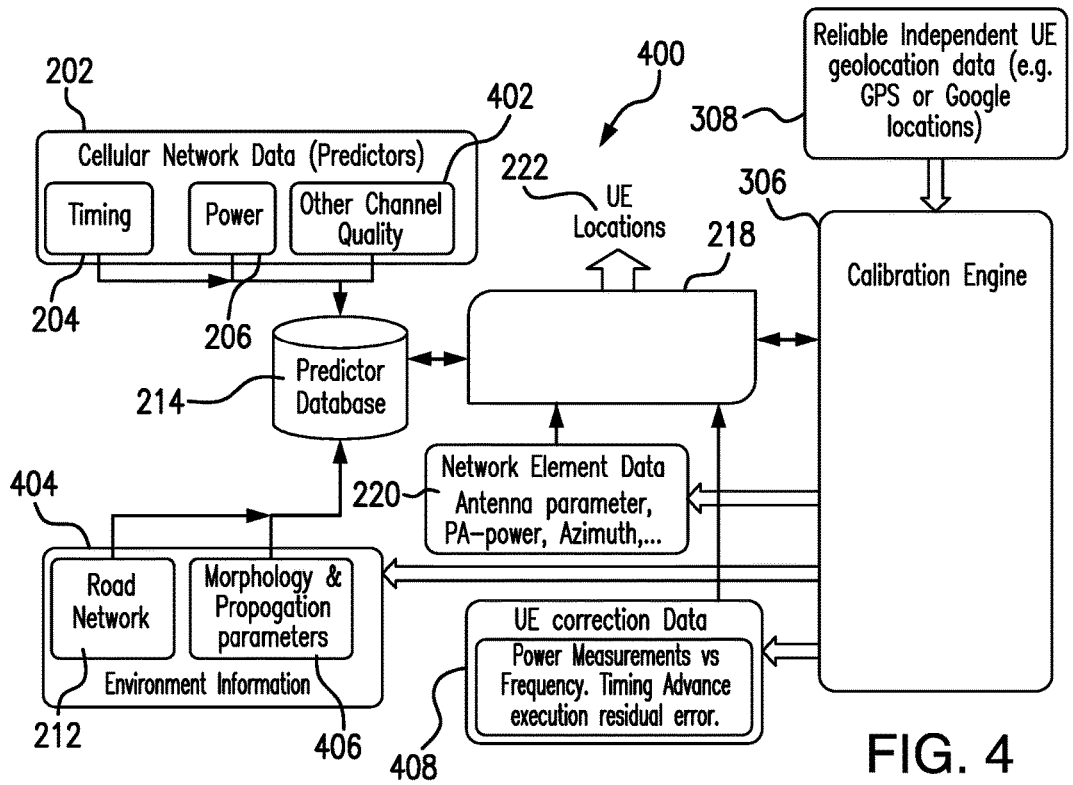
FIG. 4 is a more detailed functional block diagram of an exemplary architecture of the geoanalytic system of FIG. 3 that utilizes passive network and UE data and calibration based on external reliable high accuracy geolocation data, in accordance with an embodiment of the present disclosure.

FIG. 4 is a more detailed functional block diagram of an exemplary architecture of the geoanalytic system of FIG. 3 that utilizes passive network and UE data and calibration based on external reliable high accuracy geolocation data, in accordance with an embodiment of the present disclosure. Elements of the geoanalytic system 400 that correspond to conventional geoanalytic system 200 described above with reference to FIG. 2 are indicated using the same reference numerals and will not be described again in detail. However, in this case, historical network data predictors 202 may include other channel quality metrics 402 in addition to timing data 204 and power records 206. Such channel quality metrics 402 may include, but are not limited to, a BER, a number of packet retransmissions, a S/N, a number of call failures, a user feedback, a user requested power-down at the same bit-rate, a user requested power-up, and the like.

As shown in FIG. 4, the predictor database 214 may include both historical network data predictors 202 and environment information 404. The environment information 404 includes road network 212 and morphology and propagation parameters 406. In one embodiment, the morphology and propagation parameters 406 may comprise a detailed path loss model for the morphology a cluster of cells are located in. The path loss model may vary, at least temporally, with seasonal vegetation variation and urbanization. As noted above, the probability function 218 may be configured to combine multiple predictors stored in the predictor database 216 as well as apply network element data stored in the network element data repository 220 to find most likely locations 222 of one or more UEs. The calibration engine 306 is configured to identify errors/differences between the calculated locations 222 and more reliable external geolocation data 308. More specifically, the external geolocation data 308 may include GPS data, MDT data or similar locations data. Other input parameters for the calibration engine 306 may include, but are not limited to, dynamic geolocation output, environment modeling information 404, network element data 220 and UE correction data 408. In one embodiment, as described below, if any errors are detected, the calibration engine 306 provides corrections to network element data 220, UE data 408 and propagation parameters data 406. The UE correction data 408 may comprise transmit power parameters, receive power parameters, timing correction value and estimated carrier frequency offset (CFO) to the transmit signal. The transmit power parameters may include one or more of a transmit power, a transmit antenna gain, a transmit power headroom, and the like. The timing correction value and/or the CFO correction value may be a quantized timing correction value and/or a quantized CFO correction value. It should be noted that the calibration engine 306 provides means of identifying variations of path loss model propagation parameters and means of calibrating them. Thus, the location estimation algorithm utilized by the geoanalytic system 400 can be self-calibrated by the calibration engine 306 based on real-time, in-the-field data.

Figure 5:
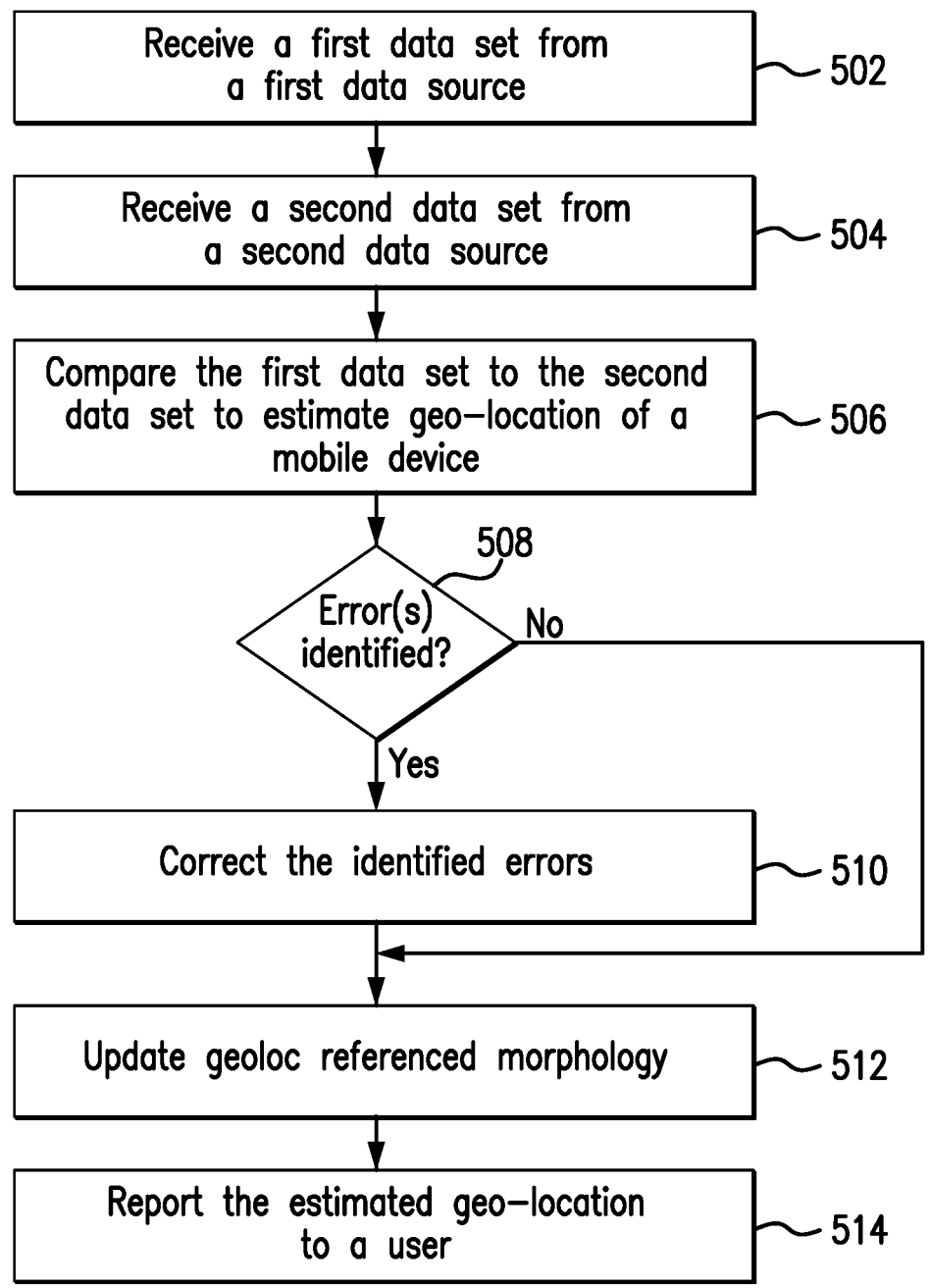
FIG. 5 is a flow diagram of a method for calibrating geolocation analytic system in a wireless network in accordance with an embodiment of the present disclosure.

FIG. 5 is a flow diagram of a method for calibrating geolocation analytic system in a wireless network in accordance with an embodiment of the present disclosure. Before turning to description of FIG. 5, it is noted that the flow diagram shown therein is described, by way of example, with reference to components shown in FIGS. 3-4, although these operational steps may be carried out in any system and are not limited to the scenario shown in the aforementioned figure. Additionally, the flow diagram in FIG. 5 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

At step 502, the probability function 218 receives a first data set from a first data source. In one embodiment, the first data set includes historical network data predictors 202, such as passive geo-location data and/or radio signal measurement data associated with a mobile device and the first data source comprises the predictor database 214. In addition to historical network data predictors 202, the first data set may include wireless network configuration data and/or NEM data that may be stored in the network element data repository 220. The probability function 218 analyzes the received geolocation data utilizing techniques well-known in the art. For example, the probability function 218 may utilize various methods of triangulation to estimate geographical coordinates (geographical region) of a mobile device/subscriber.

According to an embodiment of the present invention, if a second data source, such as the reliable external geolocation data source 308 is available, then, at step 504, the calibration engine 306 receives a second data set comprising geo-location data associated with the mobile device from the second data source along with the estimated geographical coordinates of the mobile device calculated in step 502. Some embodiments may include use of a location enabled application installed on the mobile device as the second data source. In various embodiments, the second data set 308 may include MDT logging measurement data, location enabled application's data, network based navigation system data and the like. If the mobile device is connected to a WiFi network or a 5G network, the calibration engine 306 may utilize other components of wireless network infrastructure. For example, the calibration engine 306 may utilize latitude/longitude of a WiFi access point or of the 5G base station as another precise location data point to calibrate with.

At step 506, the calibration function 306 compares the first data set to the second data set to estimate more precise geo-location of the mobile device and/or to identify one or more errors. In one embodiment, the geo-location of the mobile device may be calculated based on terrain and morphology maps and signal propagation parameters data 406. Generally, coarse timing information (e.g., the propagation delay between a base station and a mobile device) is distributed from base stations to mobile devices using conventional signaling techniques, while fine timing information is distributed from base stations to mobile devices by using the fine timing information to modulate a carrier signal. In one embodiment, step 506 may involve identification of a calculated signal propagation delay value error or a calculated timing advance value error. In another embodiment, errors identified in step 506 may include errors in configuration data stored in the network element data repository 220. Such errors may include one or more errors in geolocation coordinates of an antenna of a base station connected to the mobile device or an error in radiation pattern orientation (azimuth and down tilt) of the antenna. At least in some embodiments, the identified errors may also include signal strength indication errors and/or received power of a signature reference signal from received from a specific base station. It should be noted that in UMTS and LTE networks individual base stations typically have their own specific signature signals and the UEs are capable of determining how much power is received from individual base stations based on their signature signal. This received signal level is referred to as Reference Signal Received Power (RSRP) in LTE or CPICH Received Signal Code Power (RSCP) in UMTS.

If one or more errors are identified (decision block 508, "yes" branch), at step 510, the calibration engine 306 corrects the identified errors. For example, at step 510, the calibration engine 306 may provide proposed corrections for network element data stored in the network element data repository 220. As another non-limiting example, step 510 may involve providing corrections to the UE data 408 and propagation parameters data 406. The UE correction data 408 may comprise transmit power parameters, receive power parameters, timing correction value and estimated carrier frequency offset (CFO) to the transmit signal. In an embodiment, the method for calibrating geolocation analytic system in a wireless network involves the calibration engine 306 automatically applying updates to the network element data 220, UE correction data 408 and the propagation parameters data 406 on a periodic basis. The calibration engine 306 may utilize the more precise geo-location of the mobile device estimated in step 506 to replace the estimated location 304 of a device based on passive network data that was determined by the analyzing engine 302 at step 502.

According to an embodiment of the present invention, after correcting all of the identified errors or in response to finding no errors (decision block 508, "No" branch), at step 512, the calibration engine 306 may improve information corresponding to morphology type of a specific geo-location. More specifically, the calibration engine 306 may initially assume a default morphology type for the geo-location. As the calibration engine 306 continues to accumulate the first data set and the second data set over time, the calibration engine 306 may update geolocation's morphology type after a predetermined period of time based on the data provided in the first and second data sets related to the specific geo-location. According to an embodiment of the present invention, at step 514, results obtained in steps 506, 510 and 512 are presented to a user via a Graphical User Interface (GUI) by the calibration engine 306.

In view of the above, various embodiments of the present invention are directed to updating the geolocation function algorithm constants and morphology information utilized by the calibration engine 306. According to an embodiment of the present invention, the calibration engine 306 is configured to automate calibration by using information collected from reliable external location sources, like GPS coordinates or environmental information. In other words, the calibration engine 306 is configured and operable to provide reasonably accurate estimate of device's geo-location through calibration using external reliable high accuracy geolocation data and a small subset of observed UE calls. In addition, utilization of the high accuracy geolocation data for calibration advantageously enables the calibration engine 306 to reasonably improve accuracy of mobile network operator's Network Element description database and improve accuracy of a path loss propagation model. Accuracy of such data is essential to successful and healthy RAN network operation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for calibrating geolocation analytic system in a wireless network, the method comprising steps of:

receiving a first data set comprising measurement data associated with a mobile device connected to the wireless network from a first data source;

receiving a second data set comprising external geo-location data associated with the mobile device from a second data source;

comparing the first data set to the second data set to estimate geo-location of the mobile device and to identify one or more errors using calibration function wherein the one or more identified errors includes a calculated signal propagation delay value error; and correcting the identified one or more errors based on the comparison including providing periodic updates to propagation parameter data.

2. The method of claim 1, wherein the step of comparing the first data set to the second data set further comprises comparing the first data set to the second data set to estimate geo-location of the mobile device based on terrain and morphology maps.

3. The method of claim 2, further comprising updating geolocation's morphology type after a predetermined period of time based on the data provided in the first and second data sets.

4. The method of claim 1, wherein the first data set includes at least one of passive geo-location data, radio signal measurement data, wireless network configuration data and Network Element data.

5. The method of claim 1, wherein the one or more identified errors comprises an error in geolocation coordinates of an antenna of a base station connected to the mobile device or an error in radiation pattern of the antenna.

6. The method of claim 1, wherein the one or more identified errors comprises a signal strength indication error.

7. The method of claim 1, wherein the one or more identified errors comprises power of a signature reference signal received from a specific base station.

8. The method of claim 1, further comprising providing the estimated geo-location of the mobile device to a user.

9. A self-calibrating geolocation analytic system in a wireless network, the system comprising:

a predictor database configured to receive and store measurement data associated with a mobile device connected to the wireless network from a plurality of first data sources;

an analyzing engine in communication with the predictor database and configured to retrieve from the predictor database and analyze a first data set comprising measurement data associated with the mobile device connected to the wireless network, wherein the analysis of the first data set provides an estimated location of the mobile device;

a calibration engine comprising a processor and a memory device coupled to the processor in communication with the analyzing engine and in communication with a second data source configured to receive and store external geo-location data associated with the mobile device, the memory device containing a set of instructions that, when executed by the processor, cause the processor to:

receive the first data set and the estimated location of the mobile device from the analyzing engine and receive a second data set comprising external geo-location data associated with the mobile device from the second data source;

compare the first data set to the second data set to adjust the estimated geo-location of the mobile device and to identify one or more errors using the received external geo-location data wherein the one or more identified errors includes a calculated signal propagation delay value error; and correct the identified one or more errors based on the comparison including providing periodic updates to propagation parameter data.

10. The system of claim 9, wherein the set of instructions that, when executed by the processor, cause the processor to compare the first data set to the second data set further cause the processor to compare the first data set to the second data set to adjust the estimated geo-location of the mobile device based on terrain and morphology maps.

11. The system of claim 10, wherein the set of instructions that, when executed by the processor, further cause the processor to update geolocation's morphology type after a predetermined period of time based on the data provided in the first and second data sets.

12. The system of claim 9, wherein the first data set includes at least one of passive geo-location data, radio signal measurement data, wireless network configuration data and Network Element data.

13. The system of claim 9, wherein the one or more identified errors further comprises a calculated signal propagation delay value error or a calculated timing advance value error.

14. The system of claim 9, wherein the one or more identified errors comprises an error in geolocation coordinates of an antenna of a base station connected to the mobile device or an error in radiation pattern of the antenna.

15. The system of claim 9, wherein the one or more identified errors comprises a signal strength indication error.

16. The system of claim 9, wherein the one or more identified errors comprises power of a signature reference signal received from a specific base station.

17. The system of claim 9, wherein the set of instructions that, when executed by the processor, further cause the processor to provide the estimated geo-location of the mobile device to a user.

* * * * *